United States Patent [19]

Wishman et al.

[11] 4,291,093

[45] Sep. 22, 1981

[54] STABILIZED POLYOLEFIN SUBSTRATE OVERCOATED WITH AN ETHOXYLATED LUBRICANT AND A PHOSPHATE ESTER

[75] Inventors: Marvin Wishman; Peter A. Taylor; James C. Leininger, all of Greenville, S.C.

[73] Assignee: Phillips Petroleum Co., Bartlesville, Okla.

[21] Appl. No.: 82,390

[22] Filed: Oct. 5, 1979

[51] Int. Cl.³ .................... B32B 27/02; B32B 27/06; B32B 27/18; B32B 27/32

[52] U.S. Cl. .................... 428/379; 252/8.6; 252/8.9; 252/400 A; 252/405; 264/176 F; 264/211; 428/378; 428/394; 428/500; 428/907

[58] Field of Search .................. 427/384; 264/176 F, 264/211; 252/400 A, 405; 428/375, 378, 394, 523, 907, 500; 8/180; 525/2

[56] References Cited

U.S. PATENT DOCUMENTS

| | | | |
|---|---|---|---|
| 3,102,869 | 9/1963 | Coover et al. | 8/180 X |
| 3,138,572 | 6/1964 | Leandri | 8/180 X |
| 3,159,449 | 12/1964 | Levine et al. | 8/180 X |
| 3,169,823 | 2/1965 | Gagliardi | 8/180 X |
| 3,192,007 | 6/1965 | Turbak | 8/180 X |
| 3,245,981 | 4/1966 | Stright | 8/180 X |
| 3,357,783 | 12/1967 | Wunderlich et al. | 8/180 X |
| 3,922,249 | 11/1975 | Mills | 252/400 A |
| 3,959,220 | 5/1976 | Hechenbleikner | 8/180 X |
| 4,000,102 | 12/1976 | Shima et al. | 264/211 X |
| 4,179,384 | 12/1979 | Mann | 252/400 A |

*Primary Examiner*—James C. Cannon

[57] ABSTRACT

Degradation-resistant polyolefin articles, such as fibers, films, sheets and the like, are prepared from polymeric compositions containing a stabilizing system comprising a hindered amine and a nickel phosphonate which have been overcoated with a finish comprising an ethoxylated lubricant and a phosphate ester. In a preferred embodiment, polypropylene textile materials having improved thermal stability are provided compositions containing a stabilizing system comprising a hindered amine and a nickel phosphonate which have been overcoated with a finish composition comprising an ethoxylated lubricant and a phosphate ester in an amount sufficient to impart antistatic properties to said composition and increase the thermal stability of said polypropylene textile materials.

24 Claims, No Drawings

STABILIZED POLYOLEFIN SUBSTRATE OVERCOATED WITH AN ETHOXYLATED LUBRICANT AND A PHOSPHATE ESTER

BACKGROUND OF THE INVENTION

This invention relates to degradation resistant polyolefin articles including filaments, fibers, films, sheets, and the like. In accordance with another aspect, this invention relates to degradation resistant polyolefin articles which contain a stabilizing system comprising a hindered amine and a metal phosphonate which are overcoated with a finish composition comprising an ethoxylated compound and a phosphate ester. In accordance with another aspect, textile materials formed from polymers of propylene containing a stabilizing system are overcoated with a finishing composition comprising an ethoxylated textile lubricant and a phosphate ester antistatic agent to impart antistatic properties and increase the thermal stability of the textile materials.

In the formation of textile materials from melt spun polypropylene it is normally necessary to apply a finishing composition to the filaments, yarns and other textile embodiments thereof to make such materials more amenable to the various operations to which they are subjected during processing, for example, spinning, winding, yarn-forming, weaving, knitting, etc., and to improve the properties of the finished products. In the processing of the textile materials, the finishing composition is intended to reduce friction between the yarn and various pieces of equipment with which it comes into contact, such as guides, rollers and the like, and in both the processing and use of the textile materials to reduce friction between the fibers themselves, to prevent fiber and yarn breakage and to minimize excessive attraction or repulsion of the filaments caused by electrostatic charges. Accordingly, such finishing compositions usually contain a lubricant and an antistatic agent. Various other additives such as bactericides, corrosion inhibitors, etc., may also be added to the finishing composition.

However, it has been found that not all thermoplastic materials respond to finishing compositions in the same manner, not all combinations of finishing agents are compatible with one another and not all finishing agents are compatible with stabilizers and the like added to the thermoplastic melt. Specifically, it has been found, in accordance with the present invention, that polypropylenes do not respond to certain lubricants in the same manner as other thermoplastic fiber-forming materials, particularly when the polypropylenes contain less than the normal amounts of stabilizing agents, such as antioxidants, or when they contain specific types of stabilizing agents. By less than normal amounts of stabilizers is meant polypropylene containing from about 0.1 to about 0.6 weight percent total stabilizers. It has also been found that certain textile lubricants have an antagonistic effect on certain stabilizers included in polypropylene melts.

Accordingly, an object of this invention is to provide degradation resistance to polyolefin articles.

Another object of this invention is to provide polyolefin articles overcoated with a finishing composition providing antistatic and thermal stability properties to the articles.

Another object of this invention is to provide a stabilizing system and a finishing composition for polyolefin articles that are compatible.

Other objects, aspects as well as the several advantages of this invention will be apparent to those skilled in the art upon reading this specification and the appended claims.

SUMMARY OF THE INVENTION

In accordance with the invention, degradation resistant polyolefin articles, including filaments, fibers, films, sheets, and the like, are prepared from polyolefin compositions containing a stabilizing system comprising a hindered amine and a nickel phosphonate which have been overcoated with a finish composition comprising an ethoxylated lubricant and a phosphate ester.

In accordance with one embodiment of the invention, the thermal stability of polyolefin textile materials is improved by preparing the textile materials from polyolefin compositions containing a stabilizing system as defined herein which have been overcoated with a finish composition comprising an ethoxylated lubricant and a phosphate ester in an amount sufficient to impart antistatic properties to said composition and increase the thermal stability of said polyolefin textile materials.

In a preferred embodiment, the polyolefin articles are produced from polymers of propylene, especially homopolymers of propylene.

DETAILED DESCRIPTION OF THE INVENTION

The polyolefins contemplated include the normally solid homopolymers, co- and terpolymers of aliphatic 1-olefins having from 2 to about 10 carbon atoms and blends thereof. Exemplary polymers include polyethylene, polypropylene, poly(1-butene), copolymers such as ethylene/propylene, ethylene/1-hexene, ethylene/1-decene, propylene/ethylene, and terpolymers such as propylene/ethylene/1-hexene and ethylene/1-butene/1,3-butadiene. Presently preferred polymers include polypropylene and propylene/1-olefin copolymers containing at least about 90 mole % propylene and from about 0.1 to about 10 mole % 1-olefin comonomer, particularly ethylene. Processes for preparing the various polymers are well known. For example, U.S. Pat. No. 2,825,725 which issued Mar. 16, 1956 to Hogan, et al. described ethylene polymers and U.S. Pat. No. 3,502,632 which issued Mar. 24, 1970 to Stedefeder, et al. described propylene polymers.

The hindered amine stabilizer component of the stabilizing system of the invention can be represented by:

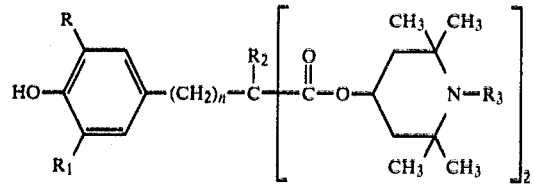

where R, R$^1$, R$^2$ are the same or different, each being an alkyl group having from 1 to about 6 carbon atoms, R$^3$ is an alkyl group having from 1 to about 12 carbon atoms, and n is an integer of 1 to 4.

Specific hindered amine compounds that can be used include: di-(1,2,2,6,6-pentamethyl 4-piperidyl)-2-n-butyl-2-(4-hydroxy-3,5-di-t-butylbenzyl)malonate, presently preferred, di-(1-dodecyl-2,2,6,6-tetramethyl-4-piperidyl)-2-methyl-2-(4-hydroxy-3,5-di-t-hexylbenzyl)-malonate, and di-(1-n-propyl-2,2,6,6-tetramethyl-4-piperidyl)-2-ethyl-2-(4-hydroxy-3,5-di-t-butylphenyl-propyl)malonate and the like, the mixtures thereof.

The metal phosphonate component of the stabilizing system of the invention can be represented by:

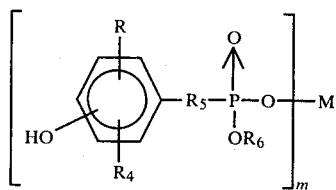

where R is as before, $R^4$ is hydrogen or alkyl having from 1 to about 6 carbon atoms, $R^5$ is an alkylene radical having from 1 to about 4 carbon atoms, $R^6$ is hydrogen or alkyl having from 1 to about 30 carbon atoms, M is a metal selected from among aluminum, barium, cadmium, calcium, chromium, cobalt, nickel, sodium, tin, and zinc, and m is an integer of 1, 2 or 3.

Specific metal phosphonate compounds that can be used include: nickel bis(O-ethyl-3,5-di-t-butyl-4-hydroxybenzylphosphonate), cobalt bis(O-n-octadecyl-3,5-di-t-hexyl-4-hydroxybenzylphosphonate), aluminum tris(O-n-butyl-3,5-di-t-butyl-4-hydroxybenzylphosphonate), sodium[O-dodecyl(3-t-butyl-4-hydroxyphenyl)ethylphosphonate], barium bis[O-triacontyl-(3,5-di-t-pentyl-4-hydroxyphenyl)propylphosphonate], chromium tris(O-n-hexyl-3,5-di-t-butyl-4-hydroxybenzylphosphonate), zinc 3,5-di-t-butyl-4-hydroxybenzylphosphonate, cadmium bis(O-octadecyl-3-methyl-4-hydroxy-5-t-butylbenzylphosphonate), tin bis(O-n-butyl-3,5-di-t-butyl-4-hydroxybenzylphosphonate) and calcium bis[O-methyl-(3,5-di-t-butyl-4-hydroxybenzylphenyl)butylphosphonate], and the like, and mixtures thereof.

In a presently preferred embodiment, the stabilized compositions of this invention are also admixed with a phenolic heat stabilizer, a colorant(s), and, optionally, an organic phosphite.

The heat stabilizer is preferably a hydroxyphenylalkenyl isocyanurate such as tris(3,5-di-t-butyl-4-hydroxybenzyl)isocyanurate. The isocyanurates are more fully described in U.S. Pat. No. 3,531,483 which issued Sept. 29, 1970, to J. C. Gilles. However, other conventional heat stabilizers such as 2,6-di-t-butyl-4-methylphenol (BHT), n-octadecyl[3-(3,5-di-t-butyl-4-hydroxybenzyl)]-propionate, di-n-octadecyl(3,5-di-t-butyl-4-hydroxybenzyl)phosphonate, tetrakis[methylene(3,5-di-t-butyl-4-hydroxyhydrocinnamate)]methane, and 2,4,6-tris(3,5-di-t-butyl-4-hydroxybenzyl)benzene, and the like can also be employed.

The organic phosphites contemplated, when used, include aryl phosphites such as tris(nonylphenyl)phosphite, alkyl phosphites such as trioctyl phosphite and dilauryl phosphite, and the like. More preferably, the organic phosphite is a diphosphite such as the pentaerythritol derivatives disclosed in U.S. Pat. Nos. 3,047,608 and 3,053,873 which issued to Friedman et al. on July 31, 1962, and Sept. 11, 1962, respectively. A particularly preferred compound is 3,9-di(octadecyloxy)-2,4,8,10-tetraoxa-3,9-diphosphaspiro[5,5]undecane, more commonly referred to as distearyl pentaerythritol disphosphite.

Suitable colorants for use in the compositions are those having sufficient thermal stability to be conventionally employed with polyolefins and can be of inorganic or organic nature. Mixtures can be used. Such colorants are commercially available in powder and concentrate form and can include, for example, titanium dioxide, carbon black, cadmium sulfide, phthalocyanine green, ultramarine blue, chelating dyestuffs such as those described in U.S. Pat. No. 3,357,783 which issued Dec. 12, 1967, to Wunderlich et al. and the like.

Each stabilizer component is used in a small, but effective, amount sufficient to provide the desired level of stabilization. The hindered amine component and the metal phosphonate component are each employed in an amount ranging from about 0.01 to about 5 wt. % based on the weight of the total composition, preferably from about 0.05 to about 2 wt. %. The weight ratio of amine/phosphonate generally ranges from about 0.1:1 to about 10:1.

The amounts of each of the heat stabilizer and processing aids, when employed, can range from about 0.01 to about 1 wt. %, preferably from about 0.05 to about 0.5 wt. %.

The amount of organic phosphite, when employed, can range from about 0.02 to about 1 wt. %, preferably from about 0.05 to about 0.2 wt. %.

The amount of colorant(s) when employed, can range from about 0.0005 to about 5 wt. %. These are normally used in an amount just needed to provide the desired shade of color for the contemplated application.

The stabilizing systems of the present invention can be incorporated into the polymer in any conventional manner, such as by dry-blending the additive systems directly with polymer pellets or fluff, by means of tumble mixers, Henschel blenders, and the like. Solutions or slurries of the stabilizers can be sprayed onto or admixed with granular polymer. The stabilizers can also be blended with a molten polymer by means of a Banbury mixer, Brabender mixer, roll mill, screw extruder, and the like. In accordance with the invention, finished compositions suitable for coating the polyolefin articles, such as fibers, films, sheets, and the like, containing the above stabilizing systems comprise an ethoxylated lubricant and a phosphate ester.

The synthetic lubricants utilized in accordance with the present invention include any of the known ethoxylated lubricants such as polyethylene glycols, mixed polyethylene-propylene glycols, monoalkyl esters of mixed polyethylene-polypropylene glycols, ethoxylated esters of fatty acids, rosin acids and tall oil acids, ethoxylated castor oils, ethoxylated hydrogenated castor oils, etc. More specifically, the ethoxylated lubricants includes, ethoxylated aliphatic alcohols, ethoxylated alkylphenols, ethoxylated sorbitan (anhydrosorbitol) esters, ethoxylated sorbitol esters, ethoxylated glycerol esters, ethoxylated pentaerythritol esters, ethoxylated fatty acids, ethoxylated fatty acid amides, ethoxylated-propoxylated fatty acids, ethoxylated-propoxylated fatty acid esters, ethoxylated-propoxylated castor oils, ethoxylated-propoxylated hydrogenated castor oils, ethoxylated-propoxylated aliphatic alcohols, ethoxylated-propoxylated alkyl phenols, etc.

Presently preferred ethoxylated lubricants include the random copolymers of the monobutyl ether of poly-(oxyethylene-oxy-1,2-propylene) having viscosities in terms of Saybolt Universal Seconds (SUS) at 100° F. (38° C.) ranging from about 170 to about 5100 and even more preferably from about 250 to about 3500, the methyl ether of poly(oxyethyleneoxy-1,2-propylene)-laurate wherein the number of moles of combined ethylene oxide is about 7 and the number of moles of combined propylene oxide is about 2, and the isododecyl ether/poly(oxyethylene) adduct wherein the number of moles of combined ethylene oxide is about 6 per mole hydrophobe.

A more complete description of the ethoxylated lubricants is given in Kirk-Othmer, *Encyclopedia of Chemical Technology*, 2nd Edition 19, 531–554 (1969). A more complete description of the polyethylene glycols, etc., is given in volume 10, pages 654–659 of the reference encyclopedia.

The phosphate-type antistatic materials utilized in accordance with the present invention include hydrocarbyl phosphate esters, ethoxylated hydrocarbyl phosphate esters, partially hydrolyzed hydrocarbyl phosphate esters or their salts. By hydrocarbyl is meant a hydrocarbon radical selected from the alkyl, cycloalkyl, aryl and combinations thereof such as alkylaryl, etc., containing from 1 to about 20 C atoms. Usually a mixture of di- and monoalkyl esters are utilized but the composition is also effective when completely esterified phosphoric acid compounds are employed. It has also been found that the use of the phosphate-type antistatic agents of the present invention are quite effective in inhibiting color formation during gas fired heat treatments if the polypropylene melt composition contains a hindered phenol as an antioxidant. It has further been found that the inhibition of color formation is influenced by the pH and the neutralizing cations employed. The lower the pH the less color produced. Preferably, the pH is maintained between about 3 and about 9 and preferably between about 4 and about 7. The preferred phosphate-type antistatic materials are the partially neutralized acid esters of phosphoric acid or the equivalent partially hydrolyzed triesters of phosphoric acid. The present order of neutralizing cations has been found to be ammonium, mono-, di- and triethanolammonium, lithium, sodium and potassium. The potassium was found to be the least desirable, although useable in accordance with the present invention.

The finish composition of the present invention also desirably contains a bactericide such as 6-acetoxy-2,4-dimethyl-m-dioxane (Givgard DXN$^R$, Givaudan Corp., Clifton, N.J.).

The relative amounts of the ingredients of the finish composition of the present application are not particularly critical. However, the ethoxylated lubricant should, of course, be used in amounts sufficient to lubricate the textile materials and the antistatic agent in amounts sufficient to prevent undesirable electrostatic charges from building up in the textile materials. Preferably, the ethoxylated lubricant is utilized in amounts between about 50 and about 98 percent by weight of the finish composition and most desirably between about 60 and 95 percent by weight of the composition. The balance of the finish composition is preferably the antistatic agent in amounts between about 2 and 50 percent by weight and most desirably between about 5 and 40 percent by weight of the finish composition. The bactericide may be present in amounts between about 0 and about 1.0 percent by weight of the final composition and like minor amounts of other suitable additives may be included, such as corrosion inhibitors.

The finish composition can be applied to the polyolefin articles in any desired manner, using conventional finish applicators, spraying, brushing, and the like. The amount of finish composition applied to the polyolefin articles is sufficient to impart antistatic properties to the composition and increase the stability of the article, e.g., a level ranging from about 0.2 to about 2.5 wt. % (dry basis) can be used with filaments.

In accordance with one particular mode for carrying out the present invention, a polyolefin melt, e.g., polypropylene, including minor amounts of a stabilizing system comprising a hindered amine and a nickel phosphonate is melt spun and the finish composition comprising a synthetic lubricant and antistatic agent is applied thereto and the resulting filamentary materials are formed into a yarn and the yarn is then wound up to form a package. While the finish compositions can be applied to the textile materials at any time during the processing thereof, it is preferably applied to the filaments as soon as they have set so that the full benefit of the stabilizing properties thereof can be realized during the later processing thereof. Thus, in accordance with this embodiment, there is produced as spun polyolefin yarns, e.g., polypropylene yarns, of highly improved thermal stability and, in many cases, of improved light and/or color stability.

If desired, the yarns thus produced can be drawtwisted and again packaged. The draw-twisting can also be applied in a continuous process prior to the initial winding or packaging of the yarn. The draw-twisted yarns are highly effective for the production of dye bags, laundry bags, and the like, when woven and formed into appropriate articles.

EXAMPLE

Polypropylene compositions were prepared by mixing nominal 12 melt flow polypropylene (ASTM D 1238-65T, condition L) having an optically determined melting point of about 170° C. with the various stabilizers, processing aid, and pigments shown later. Mixing was conducted in a Henschel blender. The material was formed into pellets in a MPM pelletizing extruder at about 245° C. Each recovered composition was melt spun at about 260° C. into an 8 strand multifilament, to which the finish was applied. The amount of finish was about 1 wt. % based on the weight of fiber. Four such strands were plied together and drawn 5X at about 135° C. to produce the yarn. The yarn was then knitted to produce sleeves about 5 cm in diameter which were cut into convenient lengths for the testing procedures. The test procedures were: (1) Gas fading—AATCC test method 23-1975. (2) Thermal stability—Sleeves about 4 cm in length were suspended from clips and hung in an electrically heated, forced air oven maintained at 95° C. The specimens were examined periodically, generally every 24 hours. Color deterioration was determined visually by comparison with a standard gray scale according to AATCC method 16E where 5 represents no change and 1 represents a drastic change. See U.S. Pat. No. 4,069,277 which issued Jan. 17, 1978 to R. D. Mathis, col. 6, 1. 60–67, where color change comparisons are described. (3) 190° F. twin carbon arc Weatherometer for UV stability. The effect of UV light on the stability of the samples was determined by mounting them on black backed Atlas mounting fadeometer cards. The black panel temperature during the test averaged about 88° C. Periodic water spraying also occurs in this test. Degradation was arbitrarily taken as the number of exposure hours required to weaken the fabric so that when it was gently scratched with a finger nail or plastic needle flaking was observed. Each fiber in the yarn was about 17 denier.

The nature of each composition employed in producing the knitted sleeves is given in Table 1. The test results obtained are given in Tables 2 and 3.

TABLE 1

| Basic Polypropylene Compositions, Wt. % Additive | | | | | |
|---|---|---|---|---|---|
| | Composition | | | | |
| Additive | 1A, 1B | 2A, 2B | 3A, 3B | 4A, 4B | 5A, 5B |
| Nickel UV Stabilizer[1] | 1.6 | | | | |
| Calcium Stearate | 0.1 | 0.3 | 0.1 | 0.1 | 0.1 |
| Antioxidant "a"[2] | 0.02 | | | | |
| Dioctylphosphite | 0.10 | | | | |
| Antioxidant "b"[3] | 0.05 | | | | |
| Nickel Phosphonate[4] | | 0.5 | | 0.2 | 0.2 |
| Nickel Stearate | | 1.0 | | | |
| Antioxidant "c"[5] | | | 0.1 | | |
| Diphosphite[6] | | | 0.1 | 0.1 | 0.1 |
| Hindered Amine[7] | | | 0.6 | 0.6 | 0.6 |
| Antioxidant "d"[8] | | | | 0.1 | 0.1 |
| Pigment Content[9] | | | | | |

Notes:
A blank indicates no additive.
[1] [2,2'-thiobis(4-t-octylphenolato)]-n-butylamine-nickel (II)
[2] octadecyl[3-(3,5-di-t-butyl-4-hydroxyphenyl)]-propionate
[3] 2,6-di-t-butyl-4-methylphenol
[4] nickel bis(O-ethyl-3,5-di-t-butyl-4-hydroxybenzylphosphonate)
[5] tetrakis[methylene(3,5-di-t-butyl-4-hydroxyhydrocinnamate)]methane
[6] distearyl pentaerythritol diphosphite
[7] di-(1,2,2,6,6-pentamethyl-4-piperidyl)-2-n-butyl-2-(4-hydroxy-3,5-di-t-butylbenzyl)malonate
[8] tris(3,5-di-t-butyl-4-hydroxybenzyl)isocyanurate
[9] Each A composition contained 0.003% Pigment Black 7, 0.001% Pigment Red 190, 0.006% Pigment Yellow 34, and 0.500% Pigment White 6 to give an off white color. Each B composition contained 0.006% Pigment Black 7, 0.004% Pigment Red 144, and 0.005% Pigment Blue 15 to give a light gray color.

TABLE 2

| Test Results - Off White Compositions | | | | | | |
|---|---|---|---|---|---|---|
| | | | Thermal | UV Stabiltity GMC-Twin Arc | | |
| Run | Finish | Composition | Gas Fade 2 Cycle | Stability 30 Days at 95° C. | 200 Hrs | 300 Hrs | Hours to Degradation |
| 1 | Control | 1A | too green to prepare color | | | | |
| 2 | Invention | 2A | 3 | 3–4 | 2 | 2 | 360 |
| 3 | Control | 3A | 4 | 1–2 | 3 | 3 | 540 |
| 4 | Control | 4A | 4 | 3 | 4 | 3 | 1040 |
| 5* | Invention | 5A | 4 | 4–5 | 4–5 | 4 | 1040 |

TABLE 3

| Test Results - Light Gray Compositions | | | | | | |
|---|---|---|---|---|---|---|
| | | | Thermal | UV Stabiltity GMC-Twin Arc | | |
| Run | Finish | Composition | Gas Fade 2 Cycle | Stability 30 Days at 95° C. | 200 Hrs | 300 Hrs | Hours to Degradation |
| 6 | Control | 1B | too green to prepare color | | | | |
| 7 | Invention | 2B | 2 | 1–2 | 1 | 1 | 360 |
| 8 | Control | 3B | 3 | 2 | 3–4 | 3 | 420 |
| 9 | Control | 4B | 4 | 2 | 4 | 4 | 800 |
| 10* | Invention | 5B | 4 | 3–4 | 4–5 | 4–5 | 800 |

Note:
The control finish employed is a commercially available material sold as NOPCOSTAT 2152P with NOPCO PLM by Diamond Shamrock Corp., Cleveland, Ohio. The exact composition is unknown but it is believed to contain ethoxylated components and no phosphate esters.
*Invention Runs Examination of the test results in Tables 2 and 3 reveals the progressive improvement in color stability and resistance to UV induced degradation as the stabilizer system is changed from a green colored, nickel phenolate—containing one of runs 1 and 6 to the light colored, nickel phosphonate—containing one of the remaining runs. It was found that the nickel phenolates when used in sufficient amounts to obtain the desired UV stability results in a green color that can not be masked sufficiently by pigments to allow light colors as off white and light gray to be produced. Substituting a combination of a nickel phosphonate and nickel stearate for the nickel phenolate and elimination of an antioxidant yield compositions 2A, 2B that can be given the desired final color. However, as the results of runs 2 and 7 show, samples prepared from the compositions show unacceptable color deterioration in gas fading and thermal stability tests and rather low UV stability. Elimination of any nickel compound and including a hindered amine, an organic diphosphite and inclusion of tetrakis[methylene(3,5-di-t-butyl-4-hydroxyhydrocinnamate)]methane as the antioxidant yield compositions 3A, 3B that also can be desirably colored. The test results of runs 3 and 8 show that a substantial improvement in UV stability is obtained. The results, however, are not outstanding and furthermore color deterioration in thermal stability and/or in gas fading tests are not acceptable.

The same stabilizer system is employed in compositions 4A, 4B, 5A, and 5B. As noted previously, they differ only in the pigments used. Aside from differences in nature and quantity of pigments employed, the primary difference between fibers prepared from the compositions is that fibers in runs 4 and 9 are lubricated with the control finish whereas those of invention runs 5 and 10 are lubricated with the preferred finish of this invention. The UV stability of the fibers of runs 4, 5, 9 and 10 are all outstanding in the accelerated weathering device employed. Similar fibers exposed to outside exposure in Florida have gone 14 months at this time with still no failures. The unexpected features observed with the inventive combination are that substantially less deterioration in color is noted in the invention runs in the thermal stability tests and appreciably less color deterioration is noted in the accelerated weathering tests at least up to 300 hours exposure. These are important differences for certain applications such as automobile fabrics where sustained exposure to elevated temperatures and UV light is to be expected.

We claim:

1. Degradation resistant articles of manufacture prepared from
   (A) stabilized polymeric compositions comprising a major amount of a polymer of a mono-1-olefin having incorporated therein a small, but effective, stabilizing amount, sufficient to stabilize said composition against the deteriorative action of ultraviolet radiation, of
   (1) at least one hindered amine represented by the formula

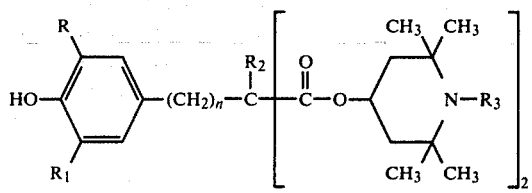

where R, $R^1$, $R^2$ are the same or different, each being an alkyl group having from 1 to about 6 carbon atoms, $R^3$ is an alkyl group having from 1 to about 12 carbon atoms, and n is an integer of 1 to 4, and
   (2) at least one metal phosphonate represented by the formula

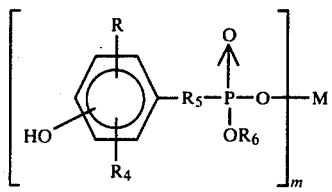

where R is as before, $R^4$ is hydrogen or alkyl having from 1 to about 6 carbon atoms, $R^5$ is an alkylene radical having from 1 to about 4 carbon atoms, $R^6$ is hydrogen or alkyl having from 1 to about 30 carbon atoms, M is a metal selected from among aluminum, barium, cadmium, calcium, chromium, cobalt, nickel, sodium, tin, and zinc, and m is an integer of 1, 2 or 3, and
   (B) overcoated with a finish composition comprising
   (a) at least one ethoxylated textile lubricant in an amount sufficient to impart lubricating properties to said composition, and
   (b) an antistatic agent comprising phosphate esters in an amount sufficient to impart antistatic properties to said composition and increase the stability of said articles.

2. An article according to claim 1 wherein said finish composition additionally contains a minor amount of a bactericide in an amount sufficient to impart antibacterial properties to the finish composition.

3. An article according to claim 1 wherein said polymer is a polymer of propylene.

4. An article according to claim 1 wherein said finish composition comprises a major proportion of ethoxylated lubricant and a significant proportion of antistatic agent.

5. An article according to claim 1 wherein
   (1) is di-(1,2,2,6,6-pentamethyl-4-piperidyl)-2-n-butyl-2-(4-hydroxy-3,5-di-t-butylbenzyl)malonate and
   (2) is nickel bis(O-ethyl-3,5-di-t-butyl-4-hydroxybenzyl phosphonate).

6. An article according to claim 5 which is a melt spun filament of a homopolymer of propylene.

7. An article according to claim 1 which is a filament.

8. A filament according to claim 7 which is formed from a polymer of propylene.

9. An article according to claim 1 wherein said polymer additionally contains
   (3) at least one phenolic stabilizer,
   (4) at least one organic phosphite, and
   (5) at least one colorant.

10. An article according to claim 9 which is a melt spun filament of a polymer of propylene.

11. An article according to claim 9 wherein said polymer contains
    (1) about 0.01 to about 5 weight percent of said hindered amine,
    (2) about 0.01 to about 5 weight percent of said metal phosphonate,
    (3) about 0.01 to about 1 weight percent heat stabilizer,
    (4) about 0.02 to about 1 weight percent organic phosphite, and
    (5) about 0.0005 to about 5 weight percent colorant.

12. An article according to claim 9 which is a filament of a polymer of propylene wherein
    (1) is di-(1,2,2,6,6-pentamethyl-4-piperidyl)-2-n-butyl-2-(4-hydroxy-3,5-di-t-butylbenzyl)malonate,
    (2) is nickel bis(O-ethyl-3,5-di-t-butyl-4-hydroxybenzyl phosphonate),
    (3) is tris(3,5-di-t-butyl-4-hydroxybenzyl)isocyanurate,
    (4) is distearyl pentaerythritol diphosphite, and
    (5) is a colorant.

13. A process comprising
    (A) forming a shaped article from a stabilized polymeric composition comprising a major amount of a polymer of a mono-1-olefin having incorporated therein a small, but effective, stabilizing amount sufficient to stabilize said composition against the deteriorative action of ultraviolet radiation of
    (1) at least one hindered amine and
    (2) at least one metal phosphonate, with the further proviso that both (1) and (2) have a structural formula as defined in claim 1, and
    (B) applying to the thus-shaped article, a finish coating composition comprising
    (a) an ethoxylated textile lubricant in an amount sufficient to impart lubricating properties to said composition and
    (b) an antistatic agent comprising phosphate esters in an amount sufficient to impart antistatic properties to said composition and to increase the stability of said shaped articles.

14. A process according to claim 13 wherein the finish composition additionally contains a bactericide in an amount sufficient to impart anti-bacterial properties to the finish composition.

15. A process according to claim 13 wherein said article is melt spun from a polymer of propylene.

16. A process in accordance with claim 13 wherein said polymer is a polymer of propylene which contains from about 0.01 to about 5 weight percent on the weight of the total polymer composition of each of said hindered amine component and said metal phosphonate component.

17. A process according to claim 16 wherein said polymeric composition is melt spun into a filament which is coated subsequently with said finish composition and wherein said finish coating is applied to said filament in an amount in the range of about 0.2 to about 2.5 weight percent (dry basis) of said filament.

18. A process according to claim 17 wherein said polymer is a homopolymer of propylene.

19. A process according to claim 17 wherein the filament is melt spun from the polymeric composition of claim 4.

20. A process according to claim 17 wherein the filament is melt spun from the composition of claim 12.

21. A process for preparing a polyolefin textile material comprising
    (a) melt spinning a polyolefin resin containing a stabilizing system comprising a hindered amine and a metal phosphonate, each of which has a structural formula as defined in claim 1 and
    (b) applying to said melt spun polyolefin a finish composition comprising an ethoxylated textile lubricant in a major amount sufficient to impart lubricating properties to said composition and an antistatic agent comprising phosphate esters in a minor amount sufficient to impart antistatic properties to said composition and increase the stability of said melt spun polyolefin textile materials.

22. A process according to claim 21 wherein said polyolefin is a polymer of propylene.

23. A process according to claim 22 wherein said polymer is a homopolymer of propylene.

24. A process according to claim 23 wherein said propylene resin additionally contains at least one phenolic heat stabilizer, at least one phosphite, and at least one colorant.

* * * * *